US011935181B2

(12) United States Patent
Lissi

(10) Patent No.: US 11,935,181 B2
(45) Date of Patent: Mar. 19, 2024

(54) IN-GAME DYNAMIC CAMERA ANGLE ADJUSTMENT

(71) Applicant: Sony Interactive Entertainment LLC, San Mateo, CA (US)

(72) Inventor: Fabio Lissi, San Mateo, CA (US)

(73) Assignee: Sony Interactive Entertainment LLC, San Mateo, CA (US)

(*) Notice: Subject to any disclaimer, the term of this patent is extended or adjusted under 35 U.S.C. 154(b) by 0 days.

(21) Appl. No.: 17/107,730

(22) Filed: Nov. 30, 2020

(65) Prior Publication Data

US 2022/0172426 A1    Jun. 2, 2022

(51) Int. Cl.
     *G06T 19/00*      (2011.01)
     *G06T 15/20*      (2011.01)

(52) U.S. Cl.
     CPC ............ *G06T 15/205* (2013.01); *G06T 19/00* (2013.01)

(58) Field of Classification Search
     CPC .................................................... A63F 13/525
     See application file for complete search history.

(56) References Cited

U.S. PATENT DOCUMENTS

| | | | |
|---|---|---|---|
| 9,446,303 B2 | 9/2016 | Shikata et al. | |
| 2009/0318223 A1* | 12/2009 | Langridge | A63F 13/54 463/31 |
| 2014/0357358 A1 | 12/2014 | Shikata et al. | |
| 2017/0157512 A1* | 6/2017 | Long | A63F 13/86 |
| 2021/0205702 A1* | 7/2021 | Sanders | A63F 13/525 |

OTHER PUBLICATIONS

Jiang, Hongda, et al. "Example-driven virtual cinematography by learning camera behaviors." ACM Transactions on Graphics (TOG) 39.4 (2020): 45-1. (Year: 2020).*
Erdem, Ali Naci. Computational aesthetics using machine learning for video game camera direction. MS thesis. Middle East Technical University, 2015. (Year: 2015).*
PCT/US2021/053521, Notification of Transmittal of the International Search Report and the Written Opinion of the International Searching Authority, or the Declaration, PCT/ISA/220, and the International Search Report, PCT/ISA/210, dated Jan. 5, 2022.

* cited by examiner

*Primary Examiner* — Ryan McCulley
(74) *Attorney, Agent, or Firm* — Penilla IP, APC

(57) ABSTRACT

A methods and system are provided for dynamically adjusting a camera angle in a video game is provided. One example method includes receiving a dataset of a plurality of video sequences that are associated with tagging data in metadata that identify characteristics of actions occurring in each of the plurality of video sequences. The method includes generating an artificial intelligence (AI) model from the dataset. The method includes accessing the AI model during gameplay of the video game. The accessing includes providing snapshots of video sequences generated during said gameplay of the video game. The method includes adjusting a game camera angle dynamically during the gameplay. The adjusting is responsive to adjustment instructions derived from said AI model.

14 Claims, 7 Drawing Sheets

IN-GAME DYNAMIC CAMERA ANGLE ADJUSTMENT

BACKGROUND

1. Field of the Disclosure

The present disclosure relates to methods and systems for dynamically changing a camera angle into video game scenes based on learned camera angles that are optimal for interactive scenes being presented in the video game to a user.

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce very detailed and engaging gaming experiences.

Example gaming platforms include the Sony Playstation®, Sony Playstation2® (PS2), Sony Playstation3® (PS3), Sony Playstation4® (PS4), and Sony Playstation5® (PS5), each of which is sold in the form of a game console. As is well known, the game console is designed to connect to a display (typically a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console may be further designed with an optical disc reader for receiving game discs for local play through the game console. Online gaming is also possible, where a user can interactively play against or with other users over the Internet. As game complexity continues to intrigue players, game and hardware manufacturers have continued to innovate to enable additional interactivity and computer programs.

Although gaming continues to see tremendous improvements in graphics, speed, and realism, gaming experiences still rely on game-developer programmed camera views into specific game scenes. For instance, depending on the interactivity and the gamer's positioning in the scene, most camera angles are predetermined or set based on developer coding set during game programming Unfortunately, as players try to experience game scenes in more dynamic ways, the camera angles may in some cases lag or not be best positioned for the interactivity occurring in the game.

It is in this context that implementations of the disclosure arise.

SUMMARY

Implementations of the present disclosure include devices, methods and systems relating to the dynamic selection and generation of camera angles into a scene generated during gaming interactivity, based on artificial intelligence selection of camera angles.

In one embodiment, a method for dynamically adjusting a camera angle in a video game is provided. The method includes receiving a dataset of a plurality of video sequences that are associated with tagging data in metadata that identify characteristics of actions occurring in each of the plurality of video sequences. In one example, the metadata includes the camera angle used in each of the plurality of video sequences. In another example, the camera angle is determined based on analysis of images in the video sequences. The method includes generating an artificial intelligence (AI) model from the dataset. The method includes accessing the AI model during gameplay of the video game. The accessing includes providing snapshots of video sequences generated during said gameplay of the video game. The method includes adjusting a game camera angle dynamically during the gameplay. The adjusting is responsive to adjustment instructions derived from said AI model.

In one implementation, the adjusting of the game camera angle causes a developer camera angle of the game to be modified or replaced.

In one implementation, generating the AI model includes extracting video feature data from each of the plurality of video sequences, and extracting metadata feature data associated with each of the plurality of video sequences. The implementation includes classifying the video feature data and the metadata feature data for processing by the AI model. The AI model is configured to process the video feature data and the metadata feature data to label said characteristics of actions occurring in each of the plurality of video sequences. The generating of said AI model occurs during a training process.

In one implementation, the AI model is configured to process said snapshots of video sequences generated during the gameplay. The processing of the snapshots of video sequences includes examining image content of one or more video sequences produced during said gameplay to produce video feature data and examining metadata associated with said examined image content to produce metadata feature data. The video feature data and the metadata feature data is classified and used by said AI model to identify said adjustment instructions for adjusting the game camera angle for presenting scenes of the video game during said gameplay.

In one implementation, said snapshots of video are generated periodically during said game play to trigger processing of said adjustment instructions for adjusting the game camera angle for presenting scenes of the video game during said gameplay.

In one implementation, said snapshots of video are generated responsive to metadata produced during said gameplay is indicative that an action scene that is occurring should include an adjustment to said game camera angle.

In one implementation, said snapshots of video are generated responsive to metadata produced during said gameplay is indicative that an action scene that is about to occur should include an adjustment to said game camera angle.

In one implementation, the tagging data is obtained from a database of user generated data (UGD), the UGD includes frames sequences that include said camera angle being marked as preferred, and said marking as preferred used to select the plurality of video sequences to use as training data for said AI model.

In one implementation, the tagging data is generated automatically based on a viewing popularity detected for frame sequences that include the camera angle, the viewing popularity used to select the plurality of video sequences to use as training data for said AI model.

In one implementation, the plurality of video sequences in the dataset are sourced from one or more of a plurality of movies, a plurality of video game recordings, a recording of a live sporting event, social media videos, or a recording that includes one or more action scenes, and said plurality of video sequences are used for training said AI model. The AI model is used during said gameplay to adjust the game camera angle in the video game during said gameplay.

In one implementation, said plurality of video sequences are used for training said AI model and the AI model is used during said gameplay to adjust the game camera angle in the video game during said gameplay.

In one implementation, said game camera angle provides an alternate field of view into scenes of the video game than a field of view programmed by a developer of the video game.

In one embodiment, a system for dynamically adjusting a camera angle in a video game is provided. The system includes a game server for executing one or more games for streaming to a client device. The system includes an artificial intelligence (AI) camera angle processor for examining snapshots of video sequences produced during gameplay of the video game. The examining of the snapshots uses an AI model for identifying a game camera angle to use in producing scenes of the gameplay. The game camera angle used for producing the scenes of the gameplay provides an alternate field of view into said scenes than a field of view programmed by a developer of the video game. The system includes a streaming server configured to compress video frames for said produced scenes that include said camera angle having said alternate field of view. The streaming server configured to transmit the compressed video frames to said client for presentation on a display that is viewable during said gameplay.

In one implementation, the examining of the snapshots using an AI model to identify a game camera angle is processed periodically while the gameplay is in progress.

In one implementation, the examining of the snapshots using an AI model to identify a game camera angle is processed during periods of times when gaming activity exceeds a predefined threshold.

In one implementation, the examining of the snapshots using an AI model to identify a game camera angle is not processed during periods of times when gaming activity does not exceed a predefined threshold.

In one implementation, said snapshots are produced during periods of times when gaming activity exceeds a predefined threshold.

In one implementation, the snapshots are not produced during periods of times when gaming activity does not exceed a predefined threshold.

In one implementation, the game camera angle, when selected to change from one programmed by the developer, is executed by a game engine so that said scenes into the video game are produced for rendering said video frames being streamed to said client.

Various embodiments will be described below for purposes of providing examples of the disclosed methods and systems. Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which.

DETAILED DESCRIPTION

The following implementations of the present disclosure provide devices, methods, and systems relating to the dynamic adjustment of camera angle views into scenes generated for a video game, and use of a model for selecting the optimal camera angles. It will be obvious, however, to one skilled in the art that the present disclosure may be practiced without some or all of the specific details presently described. In other instances, well known process operations have not been described in detail in order not to unnecessarily obscure the present disclosure.

Figures 1, 2:
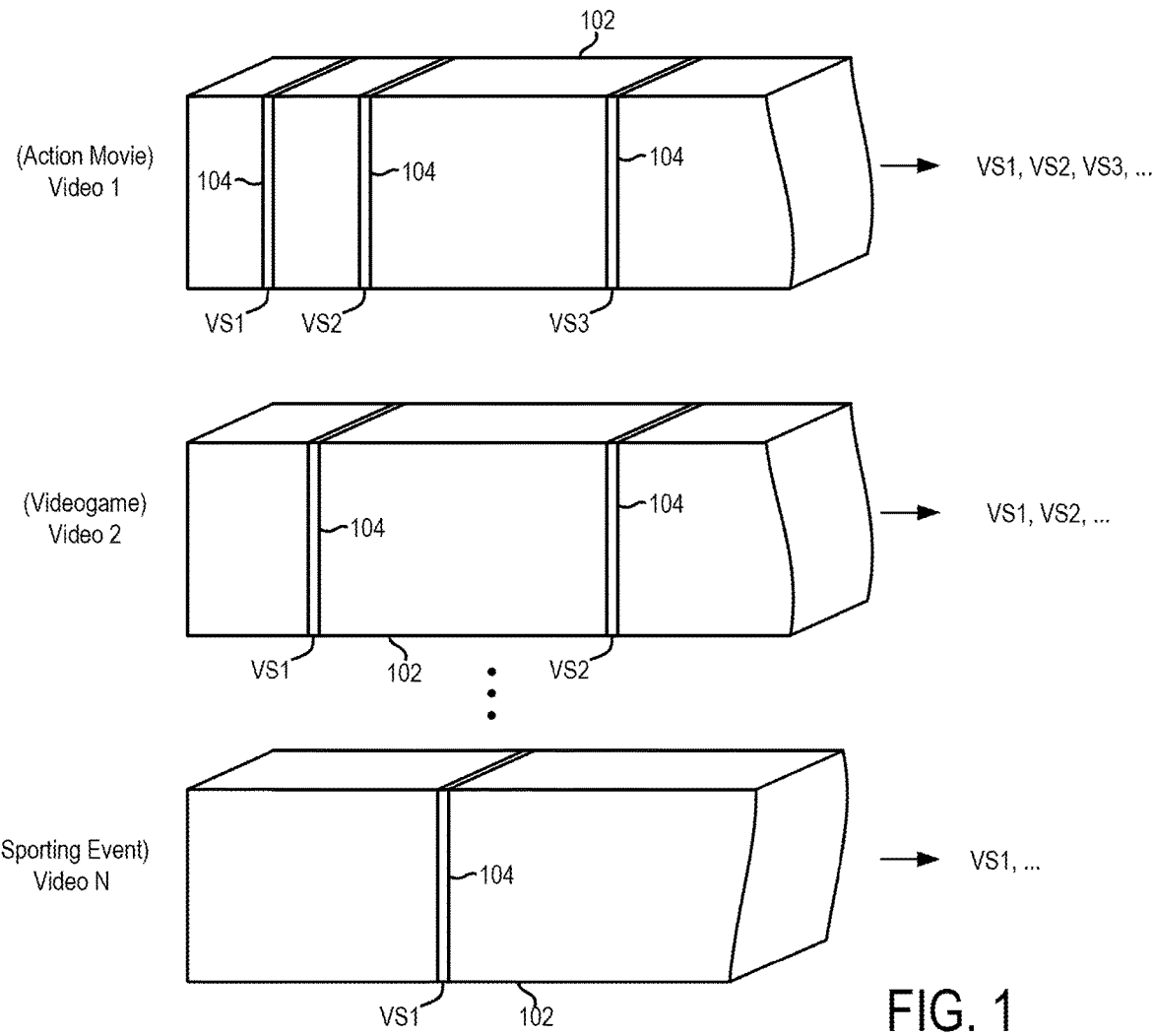
FIG. 1 illustrates a graphical view of the plurality of video streams, consisting of various different types of videos, in accordance with one embodiment.
FIG. 2 illustrates an example of a dataset, identifying video sequences that were tagged in different types of videos, in accordance with one embodiment.

FIG. 1 illustrates a graphical view of the plurality of video streams, consisting of various different types of videos. For example, video 1 may be an action movie, video 2 may be a video game recording, video game N might be a video of a sporting event that was recorded. These different types of videos may be selected for training purposes in generating a dataset that includes video sequences that highlight scenes where specific camera angles are utilized in an optimized manner By way of example, in video 1, several different video sequences 104 can be identified from the video, where different types of actions are occurring and the corresponding camera angles are determined to be optimized or have better positioning relative to other camera angles.

For example, if in video 1, the action movie has a scene where a race car is crossing the finish line, and the camera angle shows the front bumper crossing the finish line, then that camera angle would be preferred instead of a camera angle that shows the race car from behind (e.g., a floating front-facing camera view). Specifically, the camera angle showing the front bumper of the race car crossing the finish line would be more interesting and provides more relevant information to the context of the action and characteristics of the actions occurring in the video at that specific time.

Continuing with this example, a video sequence 104 (VS 1) may represent a plurality of video frames selected to show actions occurring in the action movie, including the video frames that show the race car crossing the finish line, while the camera angle is focused on a side view of the race car to show the bumper crossing the finish line. Similarly, in the same action movie, video 1, other video sequences, e.g., VS2, VS3, VSN may be selected as representing video scenes where the camera angle has been positioned and selected to optimize the interactive view of the actions occurring in the video. It should be understood that some videos may have more or less video sequences identified as being relevant or having optimize camera angles.

Similarly, if video N represents a recording of a sporting event, certain of the video frames may represent actions occurring in the video where the camera angle is optimized. For instance, if the video is of a soccer game, and a corner kick is occurring in the video, it would be optimized for the camera angle to show the kicker's view. That is, if the camera angle is presented as a field of view into the scene of the soccer game, where the view is taken from the player taking the kick, then that camera angle would be considered optimal. By way of example, if the camera angle were taken from above (e.g., showing a top view of the soccer field), then the camera angle would not allow showing of how the soccer ball travels in a trajectory toward the net.

The selection of each of the video sequences in the various videos can be performed in various processing operations. One process operation can include receiving selection from a viewer of the video. The selection can occur while the viewer is watching the video and providing input that tags the video when the camera angle is optimal or believed to be optimized for the content/actions being viewed. In one embodiment, the tags can include providing information regarding the content being viewed in the video sequence. For instance, the viewer can identify the action as a corner kick in the soccer game, which provides for a scene identifier (ID). In one embodiment, the tag can be applied for a period of time. For example, the tag can apply for a time slice of the video being watched, e.g. between time 1:20-time 1:23 (representing 3 minutes).

During those 3 minutes, at 60 frames per second, approximately 10,800 frames are tagged. In some cases, the tagging can be shorter in time or longer in time (representing fewer or more tag to frames). In other embodiments, the tag can be associated to a predetermined number of frames. For example, when the viewer tags the video for identifying a video sequence having an optimized camera angle for a specific action scene, the tagging can associate a set number of frames before and after the tag. The number of frames is programmable, and can change depending on the type of video content. For instance, sporting videos may require more frames (e.g., 400 frames) to be captured for the video sequence, while certain video game scenes may require fewer frames (e.g., 200 frames).

In still other embodiments, the tag can be associated to a shorter number of frames, e.g. between 5 to 20 video frames. In some cases, the analysis of the tag video sequence of frames may be limited to one or more frames of the sequence. For instance, if analysis of a single frame identifies the action occurring in the frame and the camera angle, then additional frames need not be processed. In some embodiments, more frames are processed until the camera angle is identified for the specific action sequence being tagged.

In another embodiment, the video sequence selection process can be performed automatically using data obtained from a database having user generated data (UGD). By way of example, certain videos can be watched by many people on a social media site, and those videos can be tagged by viewers. The tags by the viewers can include thumbs-up, commentary, edits, emoticons, etc. This UGD information can be processed to infer that specific time frames in the video are significant or have exhibited viewing popularity. In one embodiment, information process from the UGD can be used to automatically tag parts of a video for analysis of the video sequences.

In one embodiment, the resulting video sequences can then be analyzed to determine the camera angles utilized and the content being shown in those specific images. Similar to the embodiments where a user specifically tags videos having optimized camera angles, the automatic tagging process can also examine different numbers of video frames. Depending on the type of video, more or less frames can be analyzed to determine the camera angles being utilized.

FIG. 2 illustrates an example of a dataset 200, identifying video sequences that were tagged in different types of videos, in accordance with one embodiment. As noted above, the video sequences (VS) can be tagged utilizing manual user tagging processes or automated tagging processes that use UGD. The dataset 200 shows that it can be defined by various video types 122. For instance, the video types 122 can include action movies, racing games, soccer games, interactive games, games of chance, live gaming events, and the like. The tagged video sequences can be associated with a scene identifier (ID).

A scene identifier can be a descriptive term provided by the person tagging the video. In another embodiment, the scene identifier can be descriptive term generated by the computer based on metadata captured from the source video. In another embodiment, the scene identifier can be generated using machine learning based on activity identified in the video frames. The dataset 200 further includes an identified camera angle 126. The camera angle 126 is identified in a descriptive string, e.g., overhead, site-left, kicker view, or other descriptive string. In another embodiment, the camera angle 126 can also be described as three-dimensional coordinates viewing into scene being provided in the video. Three-dimensional coordinates can identify a position (e.g., X, Y, Z), and orientation (e.g., roll, pitch, yaw). These three-dimensional coordinates identify the camera angle associated with the tagged scene identifier.

In one embodiment, the three-dimensional coordinates are generated by a processor that approximates the three-dimensional coordinates based on the viewing angle and feel the view provided into the video scene. In other embodiments, the three-dimensional coordinates can be provided by the user that is tagging the video. In some embodiments, the three-dimensional coordinates can be provided as a combination of computer-generated and manually entered, to define the camera angle 126. The dataset 200 can also include frame identifiers (IDs) 128. The frame identifiers will identify a number of frames that are associated with each video sequence, for a specific video. For example, for the action movie video sequence 104 can be identified as VS1, video 1. The video sequence VS1 can identify specific time frames in the video, e.g., frames between time 1:20-1:23, or specifically identified numerical frames in the video.

In the dataset 200, the video type 122, the scene identifier 124, the camera angle 126, and the frame IDs 128 can be part of or define metadata 204 in the dataset 200. Also shown is part of the dataset 200 are the video sequences 129 from the videos 206. These video sequences can be separate files representing parts of the video that were tagged. In another embodiment, the videos 206 can be indexes to the actual videos that are saved in separate files. Once dataset 200 has been constructed, the can be utilized as part of a training algorithm for a camera angle artificial intelligence (AI) model 350, that will be used to provide dynamic selection of camera angles during gameplay.

Figure 3:
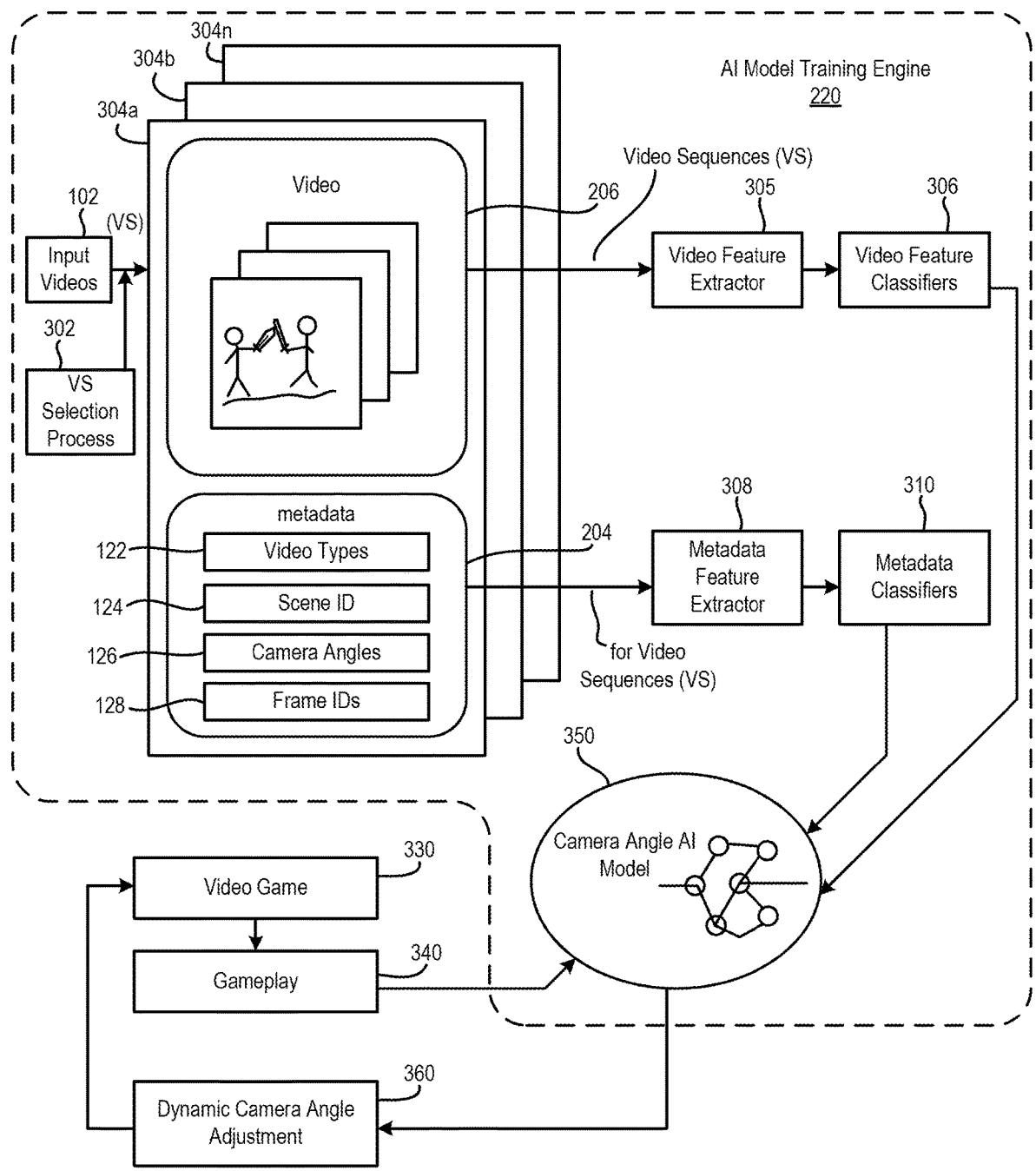
FIG. 3 illustrates an example of an AI model training engine, utilized for processing videos and metadata when training a camera angle AI model, in accordance with one embodiment.

FIG. 3 illustrates an example of an AI model training engine 220, utilized for processing videos 206 and metadata 204 when training a camera angle AI model 350, in accordance with one embodiment. As shown, input videos 102 are processed to identify video sequences, as discussed with reference to FIGS. 1 and 2. The video sequence selection process 302 is utilized to identify the video sequences in the different videos. As mentioned above, the video sequence selection process 302 can be performed manually by viewers of videos that are tagging videos or programmatically by a computer that identifies activity, actions, scenes, user feedback, popularity, interest, or other key features for auto tagging one or more video frames in input videos 102. As mentioned above, the tagging of the input videos will identify video frames for associate video sequences, and the video sequences will be associated with metadata 204.

Metadata 204 is shown to include video types 122, scene identifiers 124, camera angles 126, and frame identifiers 128. In some embodiments more or less of this type of information can be included in metadata 204. For example, some metadata may be obtained directly from the video frames or metadata embedded in the video frames that are associated with videos. For instance, the video types can be fields in a large metadata file that is associated with a video, and such data can be captured therefrom. Other data can also be captured from the source videos depending on the type of input videos provided. As shown, the videos 206 and the metadata 204 are associated with video sequences 304a, 304b, . . . 304n. These captured video sequences are then processed by the AI model training engine 222 extract feature data usable by the camera angle AI model 350. As illustrated, the video sequences are analyzed by a video feature extractor 305.

Again, input videos 102 are selected to include different types of interactive content. The interactive content can be selected from any type of video, which includes videos that are recorded from video gameplay, movies, short films, video clips, multimedia videos, social media videos, etc. The input videos 102 are processed to identify video sequences 104 that represent interactive content for specific scenes and associated camera angles. As mentioned above, video sequence selection process 302 may be utilized to select the various video sequences 304a, 304b, . . . 304n. The video sequences 304a, 304b, . . . 304n are generally represented by video sequences 104 in FIG. 1, representing one or more video sequences selected from different types of videos 206 and their associated metadata 204.

As mentioned above, the metadata 204 can include one or more of the different types of metadata content illustrated in metadata 204. In some embodiments, metadata 204 can include other types of metadata information, other than those identified in metadata 204. Generally speaking, the metadata 204 is data that describes or identifies information regarding the videos 206. In one embodiment, the AI model training engine 220 receives the videos 206 as video sequences that are then processed by a video feature extractor 305. The video feature extractor 305, in one embodiment, examines the video content in the specific video frames or images to identify characteristics of objects, colors, characters, actions, changes in movement, changes direction, motion of objects, and other identifying characteristics.

These features that are extracted can also be examined by pixel data analysis, and other learning algorithms that identify and characterize pixel data to correlate the pixel data to objects found in the images associated with the video frames. Once the video feature extractor 305 has extracted video feature data, that video feature data is processed by a video feature classifier or multiple classifiers in operation 306. The classification of the identified features is used to identify and track features and their actions between the relative changes in the examined video frames. The classified features are then processed by the camera angle AI model 350.

The camera angle AI model 350 processes the classified features to determine or approximate the camera angle utilized in each of the video frames or groups of video frames. Similarly, metadata feature extractor 308 reads the metadata 204 to identify metadata feature data. The metadata classifiers 310 then classify those identified metadata features to be processed by the camera angle AI model 350. In some embodiments, the camera angle is identified in the metadata 204. In other embodiments, the camera angle is determined based on the views provided in the classified video features processed by the camera angle AI model 350.

In other embodiments, the camera angle AI model 350 approximates the camera angle utilized in one or more of the video frames, and relates those camera angles to the type of actions occurring in the video frames. Over time, the camera angle AI model 350 continuously learns the type of camera angles that best reflect the action occurring in the video frames. The more training that occurs over time, the camera angle AI model 350 will be able to identify or predict the best camera angles to utilize in specific action scenes found in specific video sequences.

In the example shown in FIG. 3, when a video game 330 is selected for play, a user will be allowed to play the game in operation 340. By way of example, the video game may be hosted by a video streaming service, and the user may be accessing the video streaming service to play the game in a streaming mode. At the video streaming service, one or more servers can be utilized to process the video game execution, streaming and associated compression. In one embodiment, one or more servers of the streaming service can also process the AI model training engine 220, or access the camera angle AI model 350. In one embodiment, if the camera angle in model 350 has been trained, then it can be accessed during the gameplay 340. During the gameplay 340, one or more video sequences are passed to the camera angle AI model 350.

The video sequences are, in one embodiment, video frames the result from the interactive gameplay of the user. These video sequences may represent a snapshot that is continuously taken, periodically taken, or taken programmatically when specific actions are occurring in the video game being played. While the video game is being played, the camera angle AI model 350 may be able to identify specific camera angles that are more appropriate for the type of gaming activity occurring in the gameplay 340. Accordingly, the dynamic camera angle adjustment 360 may process the output from the camera angle AI model 350. The dynamic camera angle adjustment 360 will then utilize that information received from the camera angle and model 350 in order to provide input to the video game 330.

The input is in the form of an adjustment instruction to adjust the game camera angle being provided to the user while playing the game in gameplay 340. For example, if during the gameplay 340 the user is attacking a boss during a boss fight, the camera angle AI model 350 may determine that the best camera angle or preferred camera angle would be a side view focused on the battle weapons. Based on this determination, the video game will dynamically change during execution of the video game by one or more servers that camera angle utilized so that the frames provided to the game player during gameplay 340 will convey the side view camera angle. This side view camera angle is different than the camera angle that would have been displayed to the user during gameplay, i.e., different than the camera angle that was programmatically set by the developer of the video game. Accordingly, this dynamic adjustment of the camera angle utilizing the camera angle AI model 350 allows the player to view scenes of a video game from camera angles that are determined to be the best camera angles for the type of interactivity occurring in the game.

Figure 4:
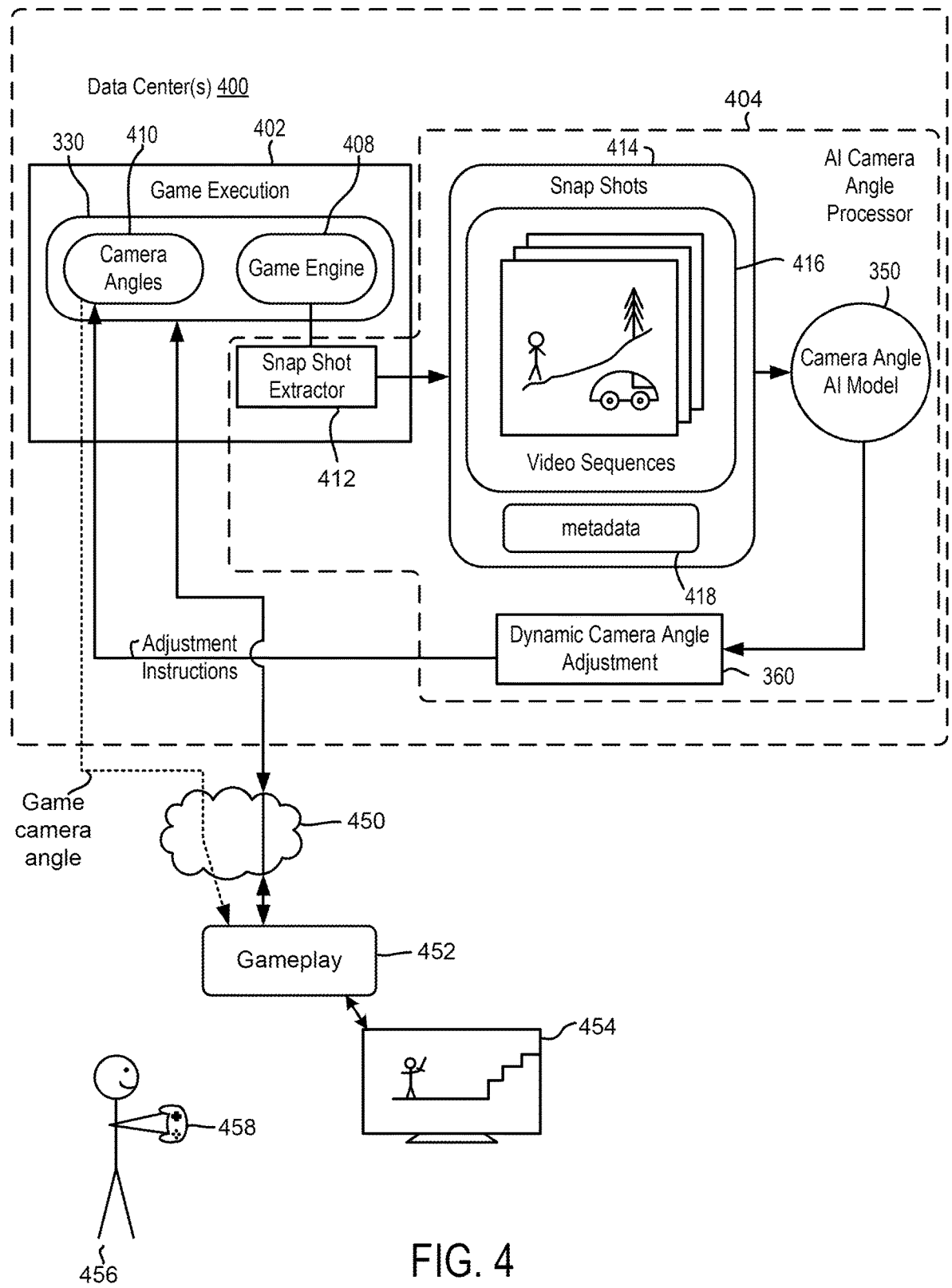
FIG. 4 illustrates an embodiment where one or more data centers are utilized to execute one or more video games and utilize the camera angle AI model, in accordance with one embodiment.

FIG. 4 illustrates an embodiment where one or more data centers 400 are utilized to execute one or more video games and utilize the camera angle AI model 350, in accordance with one embodiment. An AI camera angle processor 404 is shown, which may be access by game server 4024 executing the video game 330. As shown, the game server 402, which may be one or more game servers implemented in a specific data center, is executing a video game 330. For illustration purposes, the game engine 408 is used to execute the video game 330, and the game engine can be integrated with camera angle logic 410. Camera angle logic 410 can be integrated with the game engine 408, or can be provided as an add-on when executed by the gaming server 402.

It should be understood that the camera angle logic 410 may also be executed on a local client, such as a game console or a personal computer. In this embodiment, a snapshot extractor 412 is utilized in conjunction with the game engine 408, and may be executed by the game server 402 during the execution of the video game 330. Snapshot extractor 412, in one embodiment, is a process that will select a video sequence from the currently executing game. The video sequence 416 that results from the snapshot 414 may be generated periodically during the gameplay. In another embodiment, the snapshot 414 may be generated during specific points in the game where activity is indicated to be high, or when specific gaming actions are occurring.

For instance, if during the game there is a slow activity scene, such as a character walking down the road or a character driving the car, or a character standing around waiting for a next action adventure, or the user deciding on the next move, etc., then snapshot 414 will be generated less frequently or held off until an action scene is occurring. In some embodiments, the snapshot 414 may be generated just before an action scene is about to occur, based on processing logic determine from the game engine or based on a learning of (or identification) the type of actions that occur in specific scenes. Generally speaking, the snapshots should be generated frequently enough so that the camera angle AI model 350 can examine those video sequences to determine if the camera angle should be switched or changed to a different camera angle.

As mentioned above, camera angle AI model 350 determines that a different camera angle should be used for a specific type of sequence or characteristics of actions occurring in the video game, then the dynamic camera angle adjustment 360 can generate an adjustment instruction. The adjustment instruction is sent to the camera angle logic 410, which is used by the game engine 408 in order to generate the new camera angle and view into the generated scenes of the video game that is occurring. In the illustrated example, the user 456 is utilizing a controller 458 the play a video game 330 in a streaming mode, and the video scenes are shown on a display 454.

In this embodiment, the video scenes shown in display 454 may be updated in terms of the camera angles utilized into the video game scene, based on the game camera angle changes provided by the execution of the camera angle logic 410. Again, the changes in the game camera angle are performed in a dynamic manner, based on what is occurring in the game play 452 and the prediction of what a better camera angle would be as processed by the camera angle AI model 350.

Figure 5A:
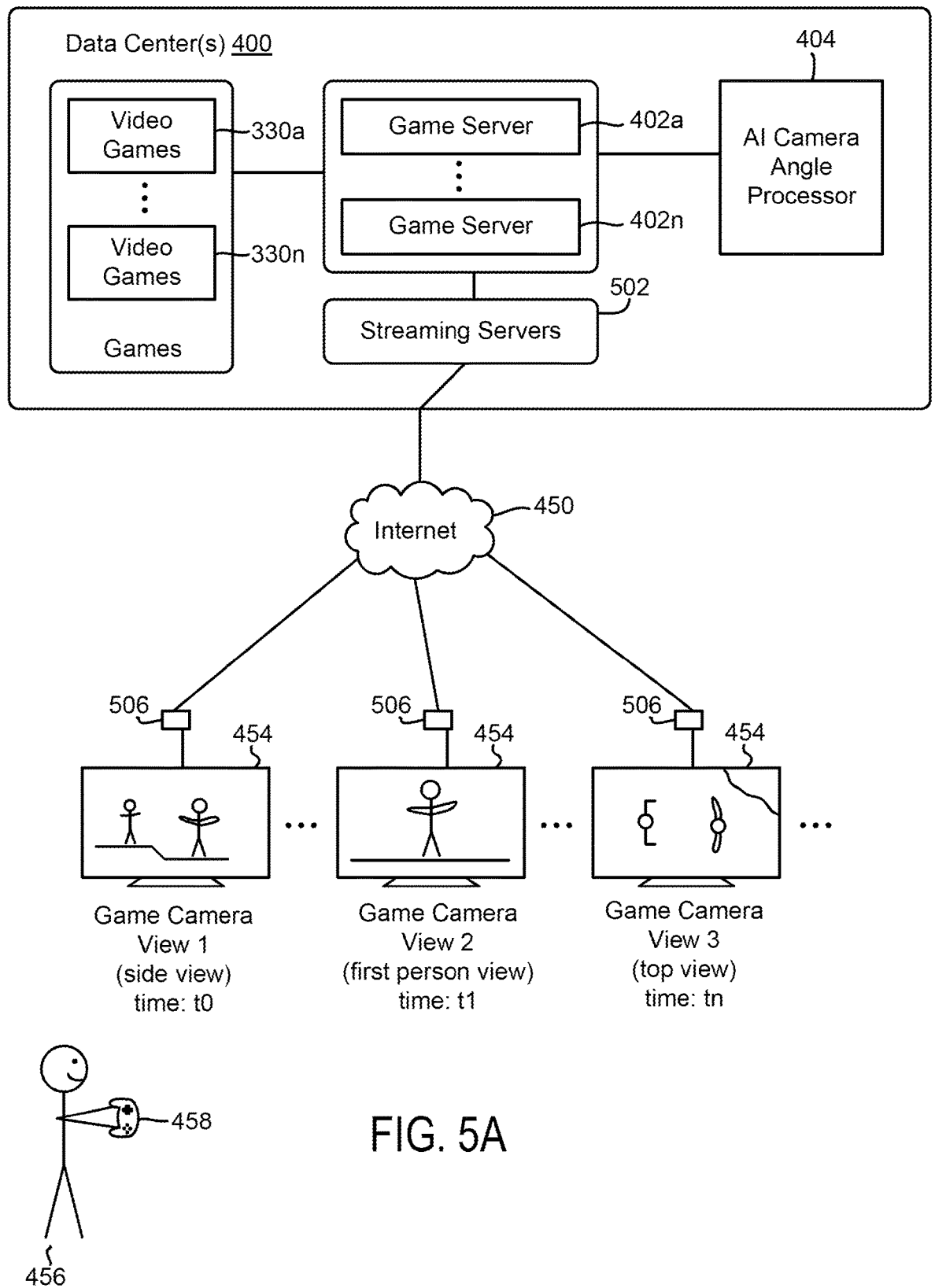
FIG. 5A illustrates an example of one of the data centers, in accordance with one embodiment.

FIG. 5A illustrates an example of one of the data centers 400, in accordance with one embodiment. In this example, the data center may include one or more databases for storing video games 330a-330n. These games would be accessible to one or more users in a streaming format over the Internet 450. It should be understood that the video games 330 can be full video games, mini games, shared slices of games, or an interactive program. The data center 400 may also include one or more game servers 402a-402n, which may be tasked with execute one or more video games depending on load requirements.

In addition, the data center may also include streaming servers 502, which work in conjunction with the game servers 402 in order to provide streaming services to the various clients 506 of users 456. In one embodiment, the streaming servers 502 can perform encoding/compression, and packetizing of the video stream for efficient presentation to the client devices 506. As illustrated, the data centers can also execute one or more AI camera angle processors 404. The AI angle processors 404 can be utilized by one or more of the game servers 402, in order to dynamically make adjustments to the game camera views provided to the users 456. As shown in FIG. 5A, the user 456 is playing a video game using controller 458. The user 456 is viewing the game on a display 454, while playing a boss fight scene of the video game. Initially, the AI camera angle processor 404 determined that the side view of the fight scene would be best at time 0.

At some other point in time t1, the AI angle processor 404 determined that the $1^{st}$ person view would provide the most interesting or dynamic view into the scene based on the current actions and characteristics of the actions occurring in the video game. Then, at some other time tn, the AI camera angle processor 404 will determine that a top view would be best suited for illustrating the activity occurring between the user and the boss during the boss fight. This illustration shows that the dynamic changes in the camera angle will occur in a seamless manner, and is used to intelligently provide the best scenes into the video game as recommended by the AI camera angle processor 404. To the user 456, viewing of the video game will be seamless and will not be evident that the camera angle is being changed dynamically away from one that was originally programmed by the game designer. However, views into the video game activity will be provided in a more interactive and context specific manner, based on the learned best views into the types of scenes being presented or encountered during the video gameplay.

Figure 5B:
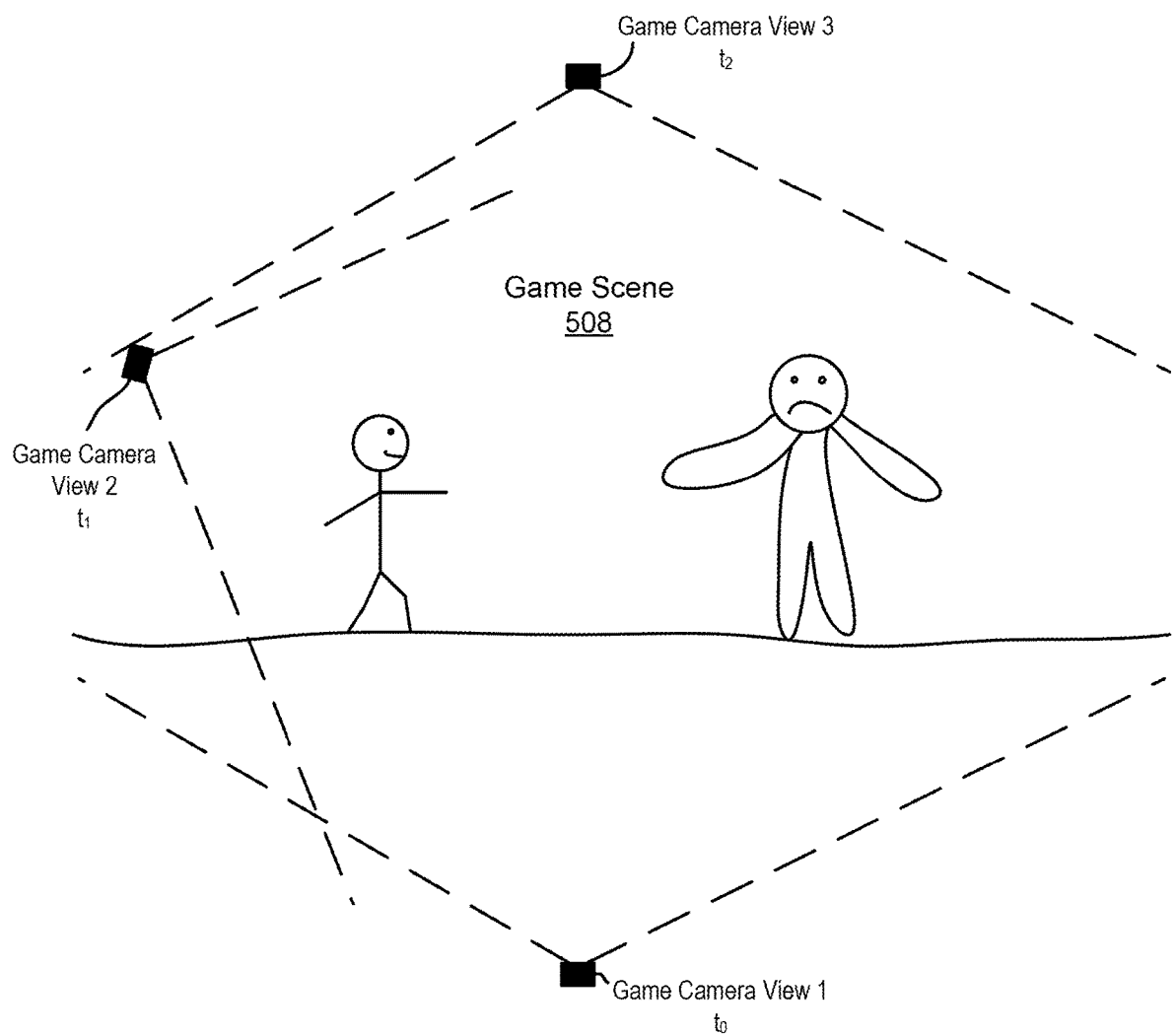
FIG. 5B illustrates an example of the switching between the different camera views, in accordance with one embodiment.

FIG. 5B illustrates an example of the switching between the different camera views. As illustrated, at time t0, the game camera view is selected from the side. At time t1, the game camera view is selected from the $1^{st}$ person view (i.e., as viewed by the character player), and at time tn, the game camera view is switched to a game camera view from above. This dynamic switching of the camera angles into the video game occur in a seamless manner and the selection is made based on the AI camera angle processor 404 that has learned during training what the best type of camera angles are for the specific types of scenes occurring in a video game.

As mentioned above, the selection of the best camera angles is not only based on the examining past gaming videos, but can also be based on examining videos from action movies, live sporting events, video clips, social media clips, social media posts, user posted videos, annotated videos, animated videos, etc. The training of the camera angle AI model 350 therefore benefits from the different types of learned camera angles that are best for the different types of content that would be encountered by users of the video game, as they interact in the interactive content.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content (i.e., video frames) that can be interactively streamed, executed, and/or controlled by user input.

Figure 6:
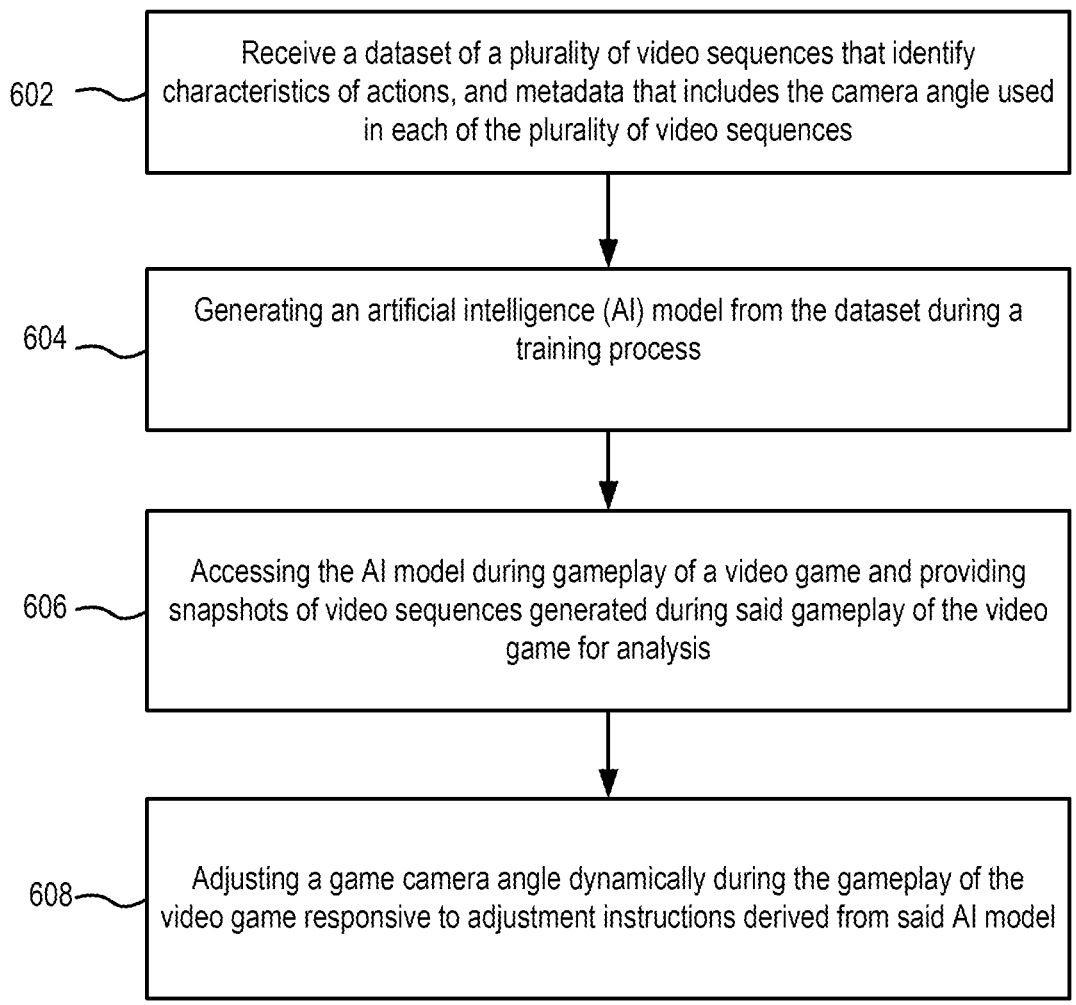
FIG. 6 illustrates a general embodiment of a method utilized for selecting a camera angle dynamically during gameplay, based on learning of the best camera angles for specific characteristics of scenes presented in interactive games, in accordance with one embodiment.

FIG. 6 illustrates a general embodiment of a method utilized for selecting a camera angle dynamically during gameplay, based on learning of the best camera angles for specific characteristics of scenes presented in interactive games, in accordance with one embodiment. In operation 602, a dataset is received for a plurality of video sequences that identify characteristics of actions that are occurring in the video game. Metadata associated with those video sequences can also be processed and the metadata can include the camera angle used in each of the plurality of video sequences.

In other embodiments, the metadata does not include the camera angle that is used, and the camera angle can be determined using machine learning upon examining the actions occurring in the video sequences and the views provided into the scenes. In one embodiment, the dataset includes the plurality of video sequences that were selected from among many types of videos ingested into the dataset. The data sent can include videos from video game recordings, movies, multimedia content, social media videos, etc. The video sequences that are part of the dataset represent sequences that show camera angles that are optimal, or determined to be the best or most popular camera angles for viewing a specific type of interactive content.

As mentioned above, the camera angles can be selected manually by viewers of videos that will tag specific scenes as including camera angles that are optimal or the best based on their subjective selection. In another embodiment, the camera angles can be selected automatically using a program that identifies camera angles that are most popular for specific types of scenes or interactivity.

In operation 604, an artificial intelligence (AI) model is generated from the dataset, based on a training process. The training process utilized as input data from the dataset that included the video sequences and associated camera angles that were determined to be optimal for the type of content and characteristics in the content. Once the AI model is trained, the end model can be utilized dynamically during gameplay to assist in selecting automatically different camera angles that are the best for the specific type of content being experienced by a gamer.

In operation 606, the AI model can be accessed by a server or process during the gameplay of a video game. The AI model will process a snapshot of video sequences generated during the gameplay of the video game for analysis. The snapshot will include one or more frames that will be analyzed to determine the interactivity, characteristics of the content, the scene interactivity, the scene characteristics, and other features that can be extracted, identified, classified, and utilized for identifying interactive content characteristics. During gameplay, in operation 608, the game camera angle can be adjusted dynamically. The dynamic adjustment can be responsive to adjustment instructions derived from the AI model.

In one embodiment, the dynamic adjustments can be made periodically during gameplay, during specific scenes where activity or interactivity is high, or programmatically based on specific scenes in the video game that would require more accurate camera views and camera angle selections. To the user, the adjustment to the camera angle will be seamless and not noticeable, aside from receiving improved camera angles into the scenes of the video gameplay. The adjustments to the camera angles represent camera angles taken into the video game that are different and apart from those that were programmed by the game developer.

Figure 7:
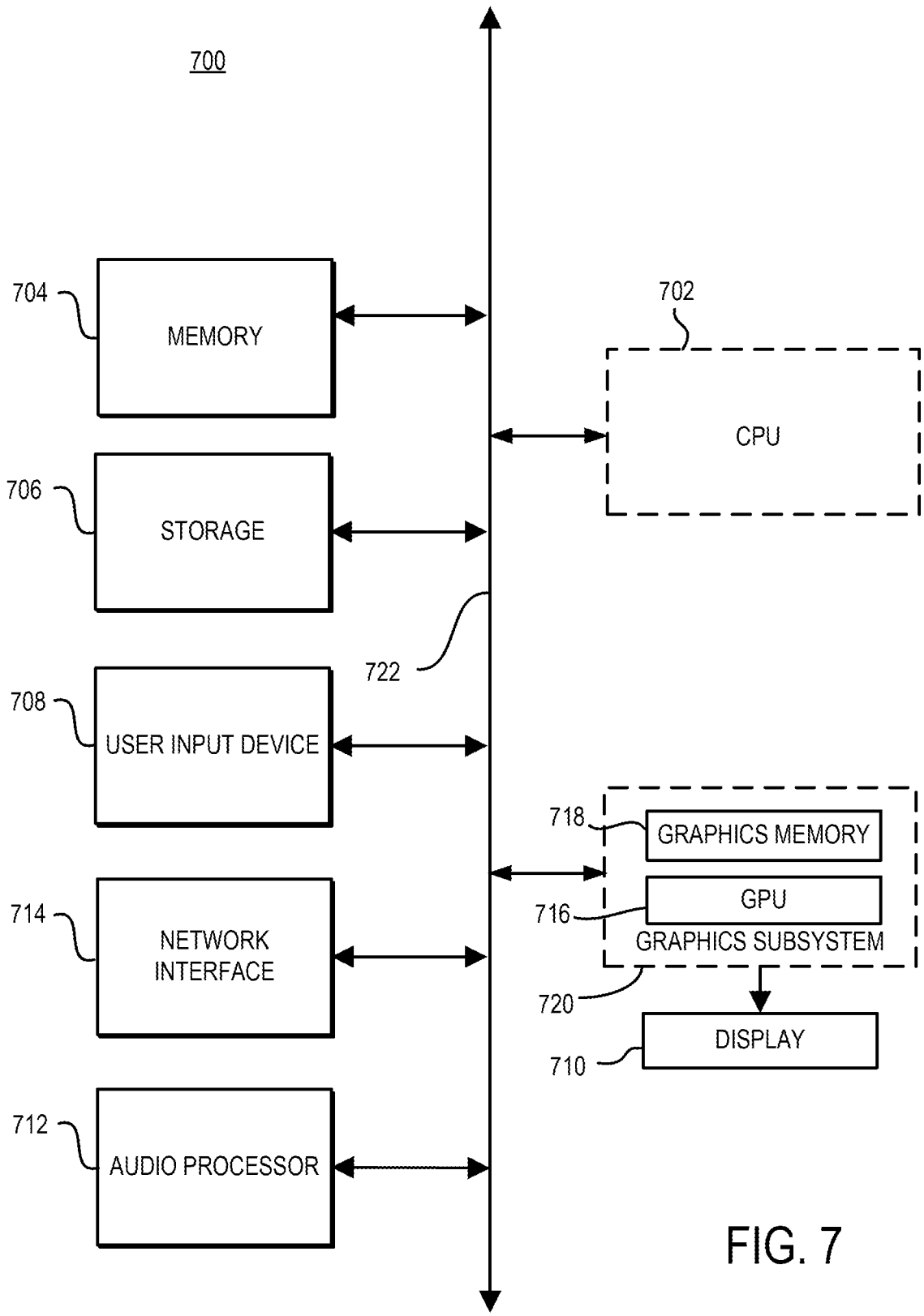
FIG. 7 is a block diagram of a Game System, according to various implementations of the disclosure.

FIG. 7 illustrates components of an example device 700 that can be used to perform aspects of the various embodiments of the present disclosure. This block diagram illustrates a device 700 that can incorporate or can be a personal computer, video game console, personal digital assistant, a server or other digital device, suitable for practicing an embodiment of the disclosure. Device 700 includes a central processing unit (CPU) 702 for running software applications and optionally an operating system. CPU 702 may be comprised of one or more homogeneous or heterogeneous processing cores.

For example, CPU 702 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 700 may be a localized to a player playing a game segment (e.g., game console), or remote from the player (e.g., back-end server processor), or one of many servers using virtualization in a game cloud system for remote streaming of gameplay to clients.

Memory 704 stores applications and data for use by the CPU 702. Storage 706 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 708 communicate user inputs from one or more users to device 700, examples of which may include keyboards, mice, joysticks, touch pads, touch screens, still or video recorders/cameras, tracking devices for recognizing gestures, and/or microphones.

Network interface 714 allows device 700 to communicate with other computer systems via an electronic communications network, and may include wired or wireless communication over local area networks and wide area networks such as the internet. An audio processor 712 is adapted to generate analog or digital audio output from instructions and/or data provided by the CPU 702, memory 704, and/or storage 706. The components of device 700, including CPU 702, memory 704, data storage 706, user input devices 708, network interface 710, and audio processor 712 are connected via one or more data buses 722.

A graphics subsystem 720 is further connected with data bus 722 and the components of the device 700. The graphics subsystem 720 includes a graphics processing unit (GPU) 716 and graphics memory 718. Graphics memory 718 includes a display memory (e.g., a frame buffer) used for storing pixel data for each pixel of an output image. Graphics memory 718 can be integrated in the same device as GPU 708, connected as a separate device with GPU 716, and/or implemented within memory 704. Pixel data can be provided to graphics memory 718 directly from the CPU 702. Alternatively, CPU 702 provides the GPU 716 with data and/or instructions defining the desired output images, from which the GPU 716 generates the pixel data of one or more output images. The data and/or instructions defining the desired output images can be stored in memory 704 and/or graphics memory 718. In an embodiment, the GPU 716 includes 3D rendering capabilities for generating pixel data for output images from instructions and data defining the geometry, lighting, shading, texturing, motion, and/or camera parameters for a scene. The GPU 716 can further include one or more programmable execution units capable of executing shader programs.

The graphics subsystem 714 periodically outputs pixel data for an image from graphics memory 718 to be displayed on display device 710. Display device 710 can be any device capable of displaying visual information in response to a signal from the device 700, including CRT, LCD, plasma, and OLED displays. Device 700 can provide the display device 710 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node.

Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g. accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g. feedback data) from the client device or directly from the cloud gaming server.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for dynamically adjusting a camera angle in a video game, comprising:

receiving a dataset of a plurality of video sequences that are associated with tagging data in metadata that identify characteristics of actions occurring in each of the plurality of video sequences, the metadata further includes the camera angle used in each of the plurality of video sequences and said tagging data includes preference information for said camera angle, wherein the plurality of video sequences include video sequences from the video game and other non-video game video sequences, and wherein said tagging data is received from a respective viewer that identifies the preference information for said camera angle;

generating an artificial intelligence (AI) model from the dataset, the AI model is trained using said plurality of video sequences by examining image content to produce video feature data and examining metadata associated with said examined image content to produce metadata feature data, the video feature data and metadata feature data is classified and used by said AI model;

accessing the AI model during gameplay of the video game by a user, the AI model further using as input snapshots of video sequences being generated during said gameplay of the video game, the snapshots of video sequences are from camera angles presented to the user, wherein the snapshots of video sequences include multiple video frames, and said snapshots of video sequences are generated responsive to metadata produced during said gameplay being indicative that an action scene is occurring or about to occur; and adjusting a game camera angle for the user dynamically during the gameplay by the user, the adjusting is responsive to adjustment instructions derived from said AI model based in part on examining image content and metadata associated with said snapshots used as input to said AI model.

2. The method of claim 1, wherein the adjusting of the game camera angle causes a developer camera angle of the game to be modified.

3. The method of claim 1, wherein
the AI model is configured to process the video feature data and the metadata feature data to label said characteristics of actions occurring in each of the plurality of video sequences;
wherein generating said AI model occurs during a training process.

4. The method of claim 1, wherein said snapshots of video are generated periodically during said gameplay to trigger processing of said adjustment instructions for adjusting the game camera angle for presenting scenes of the video game during said gameplay.

5. The method of claim 1, wherein the tagging data is obtained from a database of user generated data (UGD), the UGD includes frames sequences that include said camera angle being marked as preferred, and said marking as preferred used to select the plurality of video sequences to use as training data for said AI model, and said preference information includes said marking as preferred.

6. The method of claim 1, wherein the tagging data is generated automatically based on a viewing popularity detected for frame sequences that include the camera angle, the viewing popularity used to select the plurality of video sequences to use as training data for said AI model.

7. The method of claim 1, wherein the plurality of video sequences in the dataset are sourced from one or more of a plurality of movies, a plurality of video game recordings, a recording of a live sporting event, or a recording that includes one or more action scenes, and said plurality of video sequences are used for training said AI model;
wherein the AI model is used during said gameplay to adjust the game camera angle in the video game during said gameplay.

8. The method of claim 1,
wherein said plurality of video sequences are used for training said AI model;
wherein the AI model is used during said gameplay to adjust the game camera angle in the video game during said gameplay.

9. The method of claim 8, wherein said game camera angle provides an alternate field of view into scenes of the video game than a field of view programmed by a developer of the video game.

10. A system for dynamically adjusting a camera angle in a video game, comprising:

a game server for executing one or more games for streaming to a client device;

an artificial intelligence (AI) camera angle processor for examining snapshots of video sequences produced and taken during gameplay of the video game from the client device, wherein the snapshots of video sequences include multiple video frames, and said snapshots of video sequences are generated responsive to metadata produced during said gameplay being indicative that an action scene is occurring or about to occur, the snapshots of video sequences are taken from camera angles presented for display to the client device, the examining of the snapshots uses an AI model for identifying a game camera angle to use in producing scenes of the gameplay during said gameplay at the client device, and wherein image content and metadata associated with said snapshots are used by the AI model during said identifying of said game camera angle, wherein said AI model is trained using a dataset of a plurality of video sequences that are associated with tagging data in metadata that identify characteristics of actions occurring in each of the plurality of video sequences, the metadata further includes the camera angle used in each of the plurality of video sequences and said tagging data includes preference information for said camera angle, wherein the plurality of video sequences include video sequences from the video game and other non-video game video sequences, and wherein said tagging data is received from a respective viewer that identifies the preference information for said camera angle;

wherein the game camera angle used for producing the scenes of the gameplay provide an alternate field of view into said scenes than a field of view programmed by a developer of the video game;

a streaming server configured to compress video frames for said produced scenes that include said camera angle having said alternate field of view, the streaming server configured to transmit the compressed video frames to said client for presentation on a display that is viewable during said gameplay.

11. The system of claim 10, wherein the examining of the snapshots using an AI model to identify a game camera angle is processed during periods of times when gaming activity exceeds a predefined threshold.

12. The system of claim 10, wherein the examining of the snapshots using an AI model to identify the game camera angle is not processed during periods of times when gaming activity does not exceed a predefined threshold.

13. The system of claim 10, wherein said snapshots are additionally not generated during periods of times when gaming activity does not exceed a predefined threshold.

14. The system of claim 10, wherein the game camera angle, when selected to change from one programmed by the developer, is executed by a game engine so that said scenes into the video game are produced for rendering said video frames being streamed to said client.

* * * * *